United States Patent [19]

Oshiage

[11] Patent Number: 4,993,284
[45] Date of Patent: Feb. 19, 1991

[54] CONTROL DEVICE FOR VEHICULAR ENGINE CONTINUOUSLY VARIABLE TRANSMISSION SYSTEM

[75] Inventor: Katsunori Oshiage, Yokosuka, Japan

[73] Assignee: Nissan Motor Company, Limited, Yokohama, Japan

[21] Appl. No.: 610,794

[22] Filed: May 16, 1984

[30] Foreign Application Priority Data

May 27, 1983 [JP] Japan .................................. 58-92414

[51] Int. Cl.[5] ............................................ B60K 41/18
[52] U.S. Cl. .................... 74/866; 364/424.1
[58] Field of Search ......................... 74/865, 866, 877; 474/18; 364/424.1

[56] References Cited

U.S. PATENT DOCUMENTS

| | | | |
|---|---|---|---|
| 3,412,240 | 11/1968 | Hunt et al. | 235/164 |
| 4,261,229 | 4/1981 | Mizuno et al. | 74/866 |
| 4,387,608 | 6/1983 | Mohl et al. | 74/866 |
| 4,458,318 | 7/1984 | Smit et al. | 474/18 X |
| 4,458,561 | 7/1984 | Frank | 74/877 X |
| 4,466,521 | 8/1984 | Hattori et al. | 192/0.076 X |
| 4,470,117 | 9/1984 | Miki et al. | 474/18 X |
| 4,475,416 | 10/1984 | Underwood | 474/18 X |
| 4,509,125 | 4/1985 | Fattic et al. | 364/424.1 |
| 4,579,021 | 4/1986 | Yamamuro et al. | 74/865 X |

FOREIGN PATENT DOCUMENTS

| | | |
|---|---|---|
| 0061735 | 10/1982 | European Pat. Off. . |
| 0108315 | 5/1984 | European Pat. Off. . |
| 0094627 | 12/1984 | European Pat. Off. . |
| 2188688 | 1/1974 | France . |
| 54-30358 | 3/1979 | Japan . |
| 54-35558 | 3/1979 | Japan . |
| 54-72360 | 6/1979 | Japan . |
| 57-90450 | 6/1982 | Japan . |

Primary Examiner—Dirk Wright
Attorney, Agent, or Firm—Foley & Lardner, Schwartz, Jeffery, Schwaab, Mack, Blumenthal & Evans

[57] ABSTRACT

A deviation of an actual reduction ratio from a desired reduction ratio is computed. A proportional and integral control is carried out so as to reduce the deviation in good response. A proportional term control gain and an integral term control gain are given different values for downshifting and upshifting, respectively, so as to provide a quick response in downshifting and a gradual response in upshifting.

4 Claims, 11 Drawing Sheets

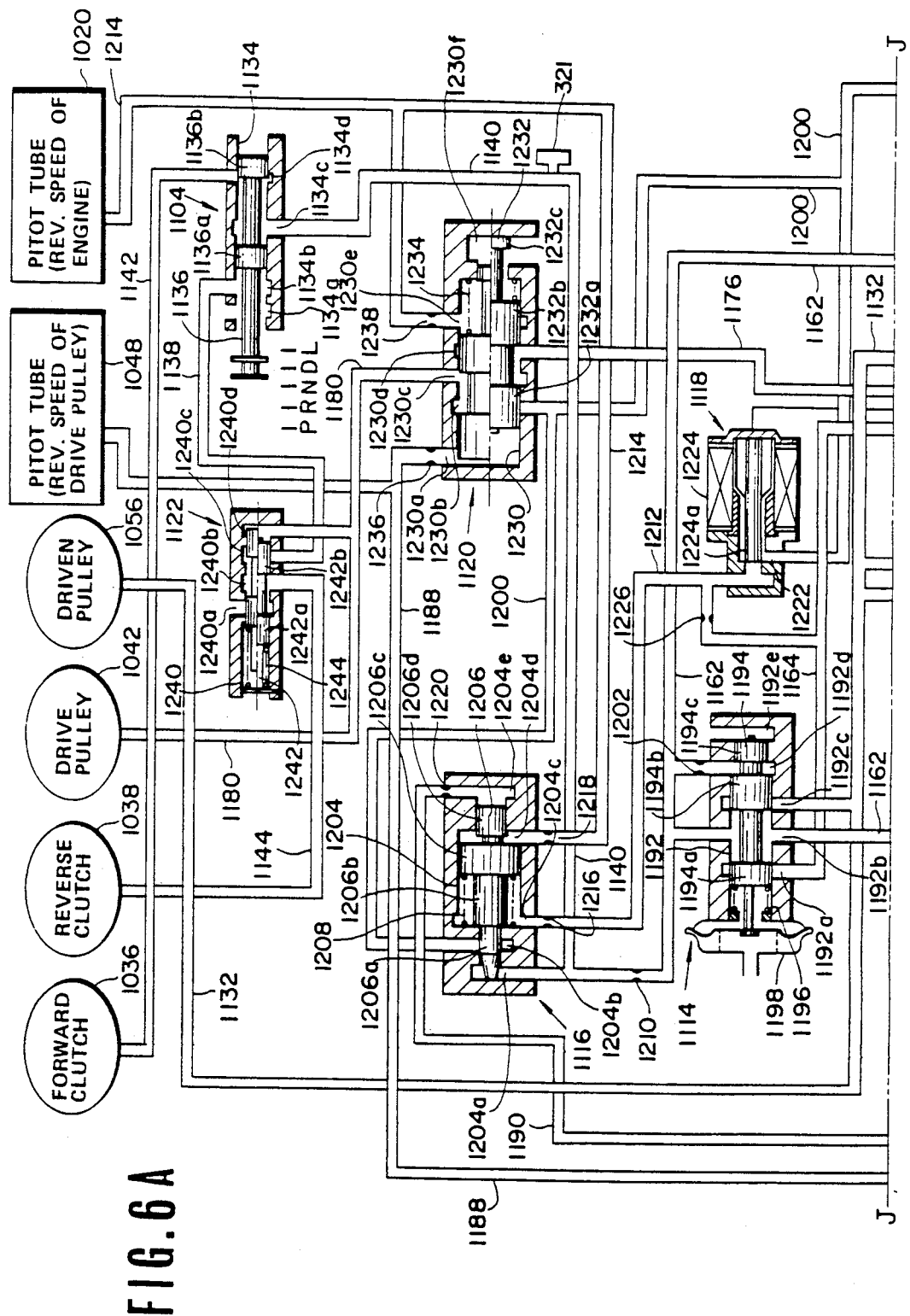

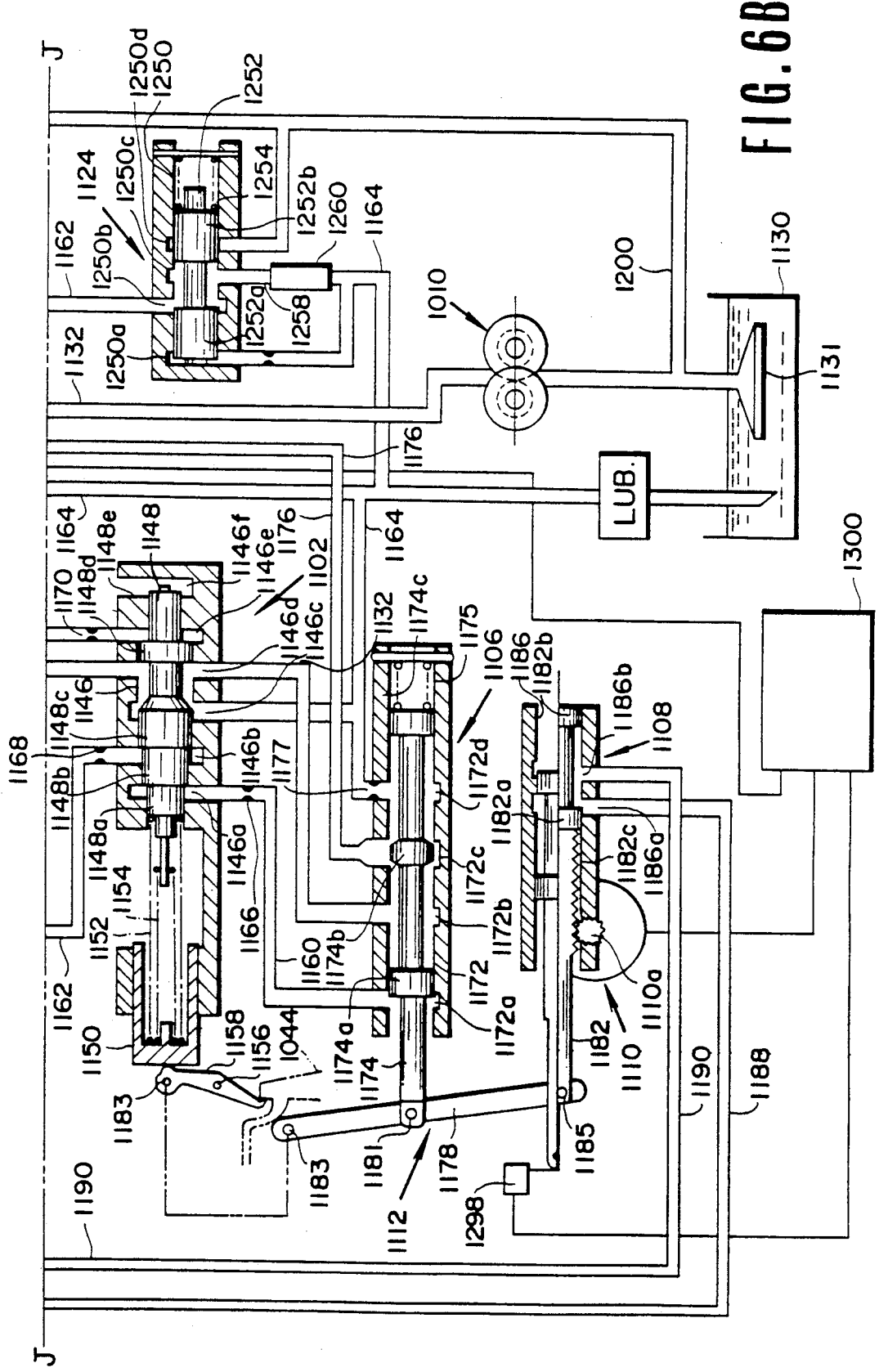

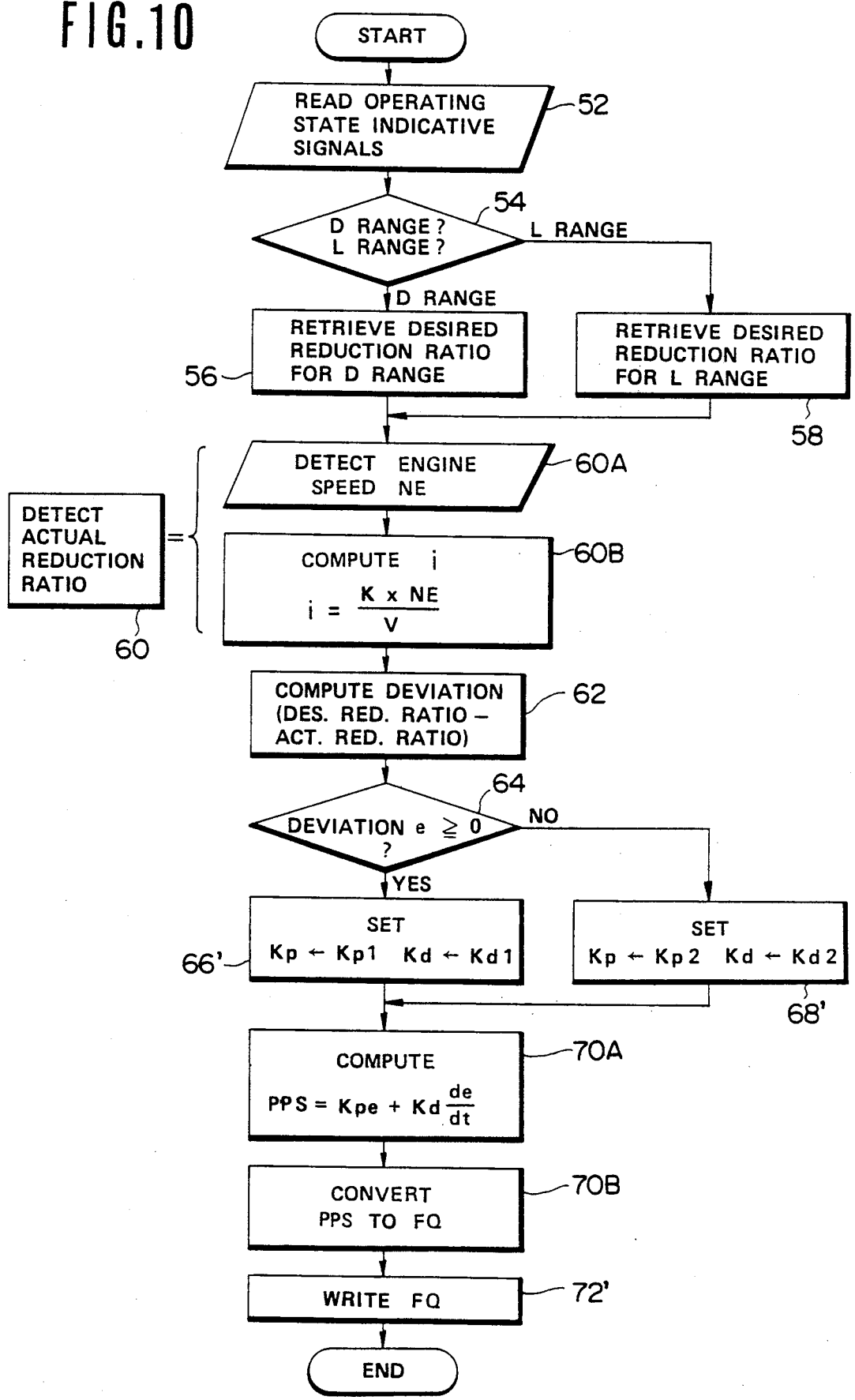

4,993,284

CONTROL DEVICE FOR VEHICULAR ENGINE CONTINUOUSLY VARIABLE TRANSMISSION SYSTEM

REFERENCE TO RELATED APPLICATIONS

U.S. patent application Ser. No. 362,489 now U.S. Pat. No. 4,543,077 filed Mar. 26, 1982 which has a corresponding European patent application 82102530.1 which was published n Oct. 6, 1982 in European Patent Bulletin No. 82/40 under the publication No. 0061735.

U.S. patent application Ser. No. 486,448 filed Apr. 19, 1983 which has a corresponding European patent application 83103772.6 filed Apr. 19, 1983.

U.S. patent application Ser. No. 560,940 filed Dec. 13, 1983 which has a corresponding European patent application 83112594.3 filed Dec. 14, 1983.

BACKGROUND OF THE INVENTION

The present invention relates to a control device for a vehicular engine continuously variable transmission system.

In a control method for a vehicular engine continuously variable transmission system which is proposed in the above mentioned U.S. patent application No. 362,489 now U.S. Pat. No. 4,543,077 a shift pattern for a throttle opening degree and a vehicle speed is stored, a shift command signal is obtained by retrieval based on an actual throttle opening degree and an actual vehicle speed, and a shift motor is controllably actuated based on this shift command signal so as to establish the desired reduction ratio. Although the shift motor actuates a shift control valve so as to control the distribution of oil pressure between a drive pulley cylinder chamber and a driven pulley cylinder chamber, this shift motor is so controlled as to rotate at a constant speed. This means that the rotational speed of the shift motor is unchanged regardless of the case where an accelerator pedal is depressed for acceleration and the case where the accelerator pedal is released for coasting.

However, the previously proposed control method poses the problem as follows. In order to provide a good shift response upon depressing an accelerator pedal for acceleration, it is the usual practice to set the rotational speed of the shift motor at a relatively high speed. This causes the shift motor to rotate at the same high speed when upshifting as when downshifting, resulting in an abrupt upshift. This abrupt shifting cause the driver to feel an acceleration even after releasing the accelerator pedal, making him/her feel uneasy.

In attempting to solve the problem as above, U.S. patent application Ser. No. 560,940 proposes a control method whereby the rotating speed of a shift motor is delayed in upshifting as compared to that in downshifting. This control method is adapted for an open loop control, and is not fit for a high precision closed loop control, thus failing to provide a complete solution to the above mentioned problem for the closed loop control.

SUMMARY OF THE INVENTION

An object of the present invention is to provide a control device for a vehicular engine continuously variable transmission system which provides with high precision a quick downshifting, i.e., a shifting toward a large reduction ratio side, for good acceleration performance as compared to an upshifting, i.e., a shifting toward a small reduction ratio side.

According to the present invention, a deviation between a desired reduction ratio and an actual reduction ratio is computed and a predetermined control constant is set in the case a downshifting is demanded which is different from another predetermined control constant for upshifting. In upshifting, a speed at which a shifting is to be effected is determined upon the corresponding predetermined control constant, while, in downshifting a speed at which a shift is to be effected is determined upon the corresponding predetermined control constant.

According to another aspect of the present invention, there is provided a control device for a vehicular engine continuously variable transmission system having a shift control mechanism including a motor. The control device comprises:

means for determining a desired reduction ratio;

means for determining an actual reduction ratio of the continuously variable transmission;

means for determining a deviation of the actual reduction ratio from the desired reduction ratio;

means for determining a first control gain if the deviation indicates a downshifting is required and a second control gain if the deviation indicates an upshifting is required and generating a control gain indicative signal;

means for computing a speed at which the motor of the shift control mechanism is to be actuated in response to the control gain indicative signal and generating an actuating speed indicative signal;

means for actuating the motor by one predetermined unit in a direction to reduce the deviation whenever it is rendered into operation; and means for periodically rendering said actuating means into operation with a frequency which is variable with the actuating speed indicative signal.

BRIEF DESCRIPTION OF THE DRAWING

FIGS. 6A and 6B, when combined, illustrate a circuit diagram of a control system for the vehicular engine continuously variable transmission system shown in FIG. 5;

FIG. 10 is a flowchart of a control program;

DETAILED DESCRIPTION OF THE INVENTION

Figure 1:
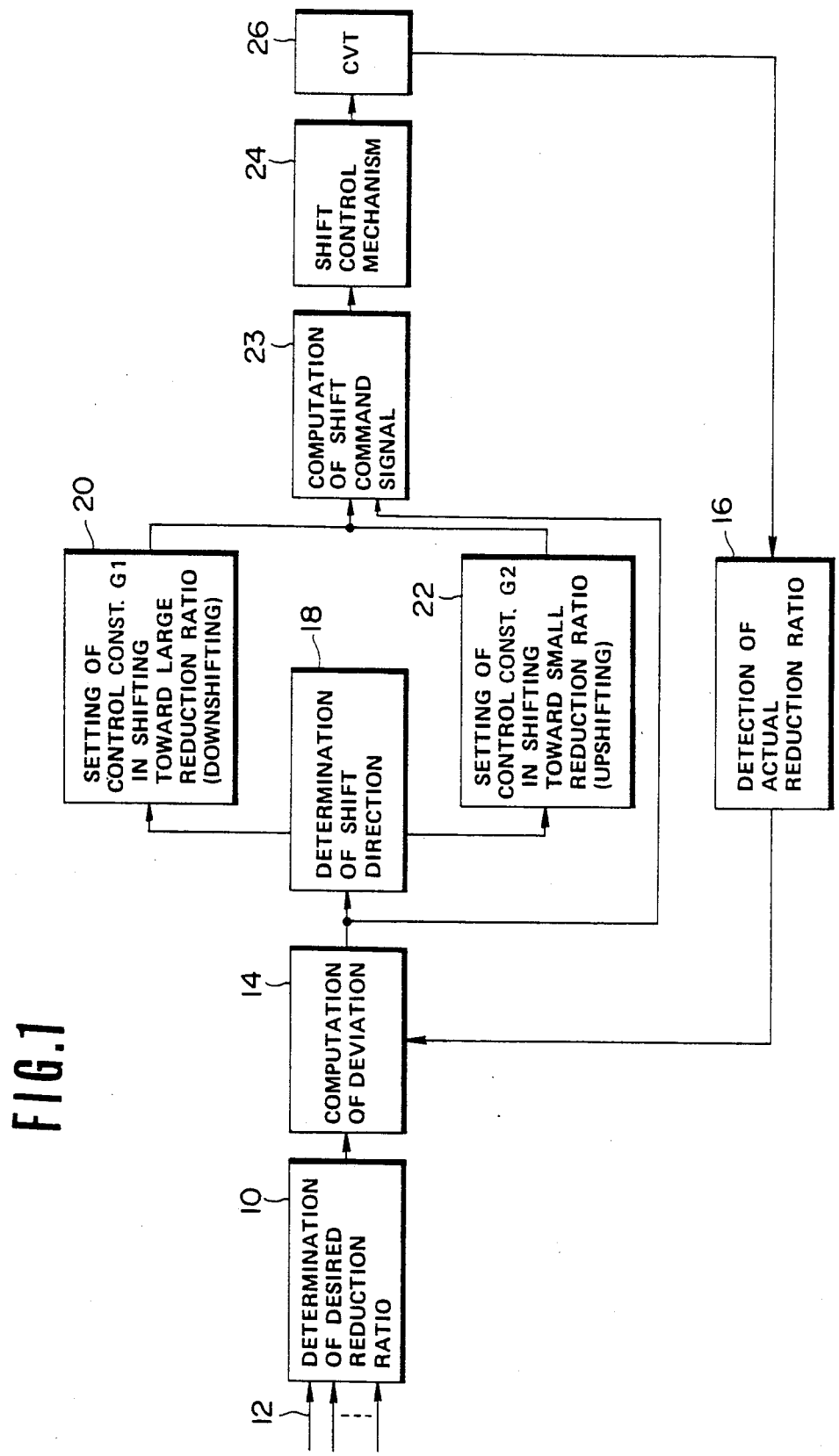
FIG. 1 is a block diagram of a control strategy employed by the present invention.

Referring to FIG. 1, a control strategy according to the present invention is described. Fed to a block 10 are a plurality of signals 12 indicative of the operating state of a vehicular engine continuously variable transmission system, for example, a vehicle speed indicative signal and a throttle opening degree indicative signal. In the block 10, a desired reduction ratio is obtained by a computation based on the operating state indicative signals 12 and a signal is generated which is indicative of the desired reduction ratio to be fed to a block 14 where a deviation is computed. The desired reduction ratio determined in the block 10 is a reduction ratio which gives an engine speed with the least fuel consumption rate for a given vehicle speed and a given throttle opening degree, as will be later described. In the block 14, the deviation is computed between the desired reduction ratio is signal fed thereto by the block 10 and an actual reduction ratio signal fed thereto by a later described block 16 where an actual reduction ratio in the continuously variable transmission (CVT) is detected. In a block 18, it is determined whether the deviation signal from the block 14 is positive or negative in order to judge which direction of shifting, i.e., a shifting in a direction toward a large reduction ratio or a shifting in a direction toward a small reduction ratio, should take place or is commanded. In the case a shifting toward a large reduction ratio side is commanded, a predetermined control constant G1 is set in a block 20 which control constant G1 determines a speed at which the reduction ratio is shifted toward a large reduction ratio side. In the case a shifting toward a small reduction ratio side is commanded, another predetermined control constant G2 is set in a block 22. The control constant G1 is larger than the control constant G2. A signal indicative of the control constant G1 or the control constant G is fed to a block 23 to which the deviation signal is also fed. In the block 23, a shift command signal is computed which commands the adjustment of an actual reduction ratio in a direction to reduce the deviation, that is, the adjustment toward the desired reduction ratio. The shift command signal is fed to the shift control mechanism 24 which varies the reduction ratio in the continuously variable transmission 26 based on this shift command signal. More specifically, a direction in which a shift control mechanism 24 is actuated and a speed at which the shift control mechanism 24 is actuated are determined, and the shift control mechanism 24 is actuated based on this information. The actual reduction ratio in the continuously variable transmission 26 is detected or monitored in the block 16 which generates the signal indicative of the actual reduction ratio and feeds this signal back to the deviation computing block 14.

Since, as described before, the control constant G1 is larger than the control constant G2, the speed at which the shift control mechanism 24 is actuated is quick in downshifting control process where the control constant G1 is used as compared to the case where the shift control mechanism 24 is actuated in upshifting control process where the control constant G2 is used. It follows that downshifting speed is quicker than upshifting speed.

The control strategy described in connection with FIG. 1 may be carried out by a microcomputer containing a control program as shown by a flowchart in FIG. 2.

Figure 2:
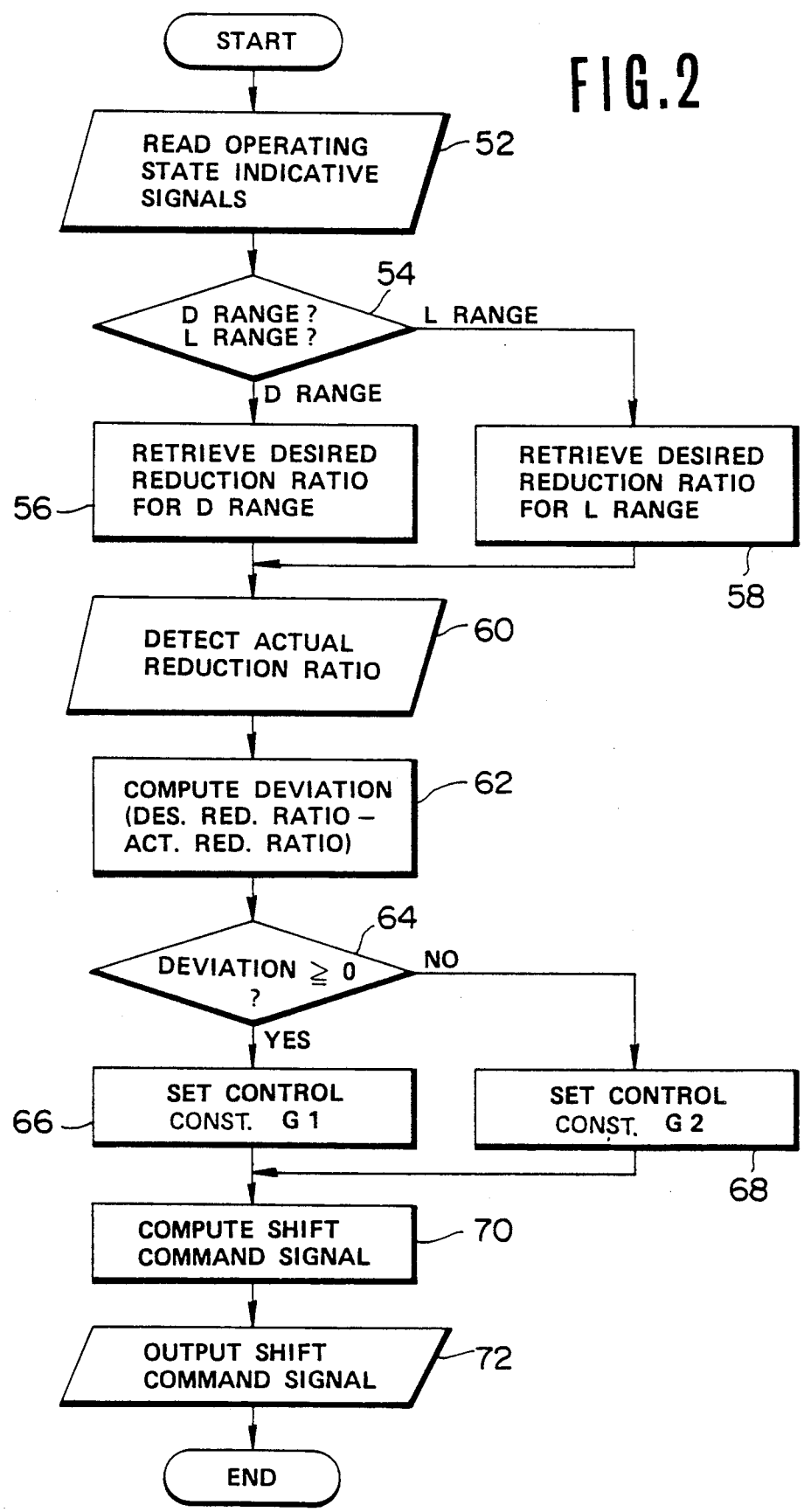
FIG. 2 is a flowchart explaining steps necessary for carrying out the control strategy shown in FIG. 1.

Referring to FIG. 2, signals indicative of operating state of the vehicle are detected (in a step 52). A determination is made whether a shift lever is in D range or L range (in a step 54). If it is in D range, a desired reduction ratio for D range is retrieved (in a step 56), while if it is in L range, a desired reduction ratio for L range is retrieved (in a step 58). An actual reduction ratio is detected (in a step 60) and a deviation between the desired reduction ratio and the actual reduction ratio is computed (in a step 62). A determination is made whether the deviation computed in the step 62 is positive or negative (in a step 64). If the deviation is positive, the predetermined control constant G1 is set (in a step 66), while if the deviation is negative, the predetermined control constant G2 is set (in a step 68). A computation is effected on the control constant G1 or G2 set in the step 66 or 68 and the deviation computed in the step 62 so as to provide a shift command signal (in a step 70). The shift command signal is sent out (in a step 72).

Figure 3:
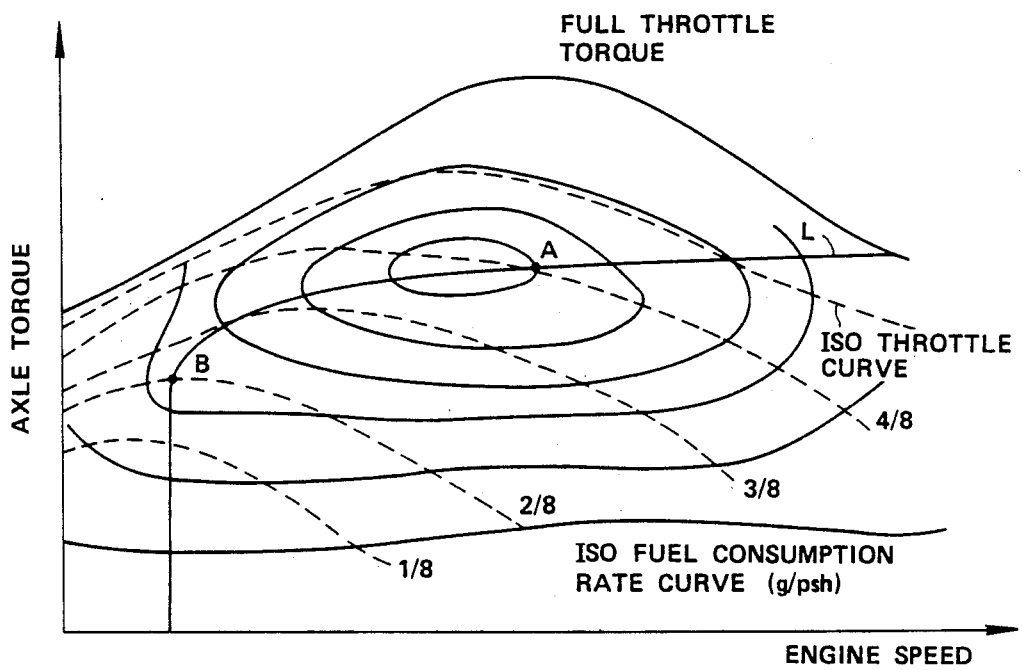
FIG. 3 shows performance curves of a vehicular engine continuously variable transmission system.
Figure 4:
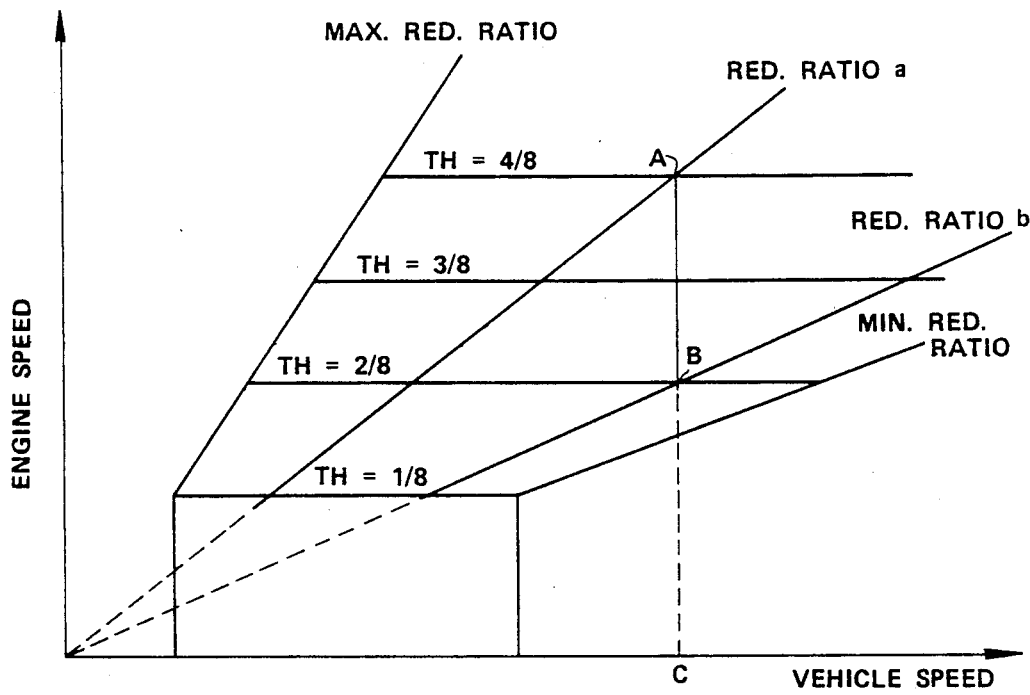
FIG. 4 is a graph illustrating a reduction ratio TABLE containing desired reduction ratios, each providing an operating point on a minimum fuel consumption rate curve L shown in FIG. 3.

Hereinafter, referring to FIGS. 3 and 4, a description is made how the control device according to the present invention works. FIG. 3 shows engine performance curves including a minimum fuel consumption rate curve L. That is, if the engine operates on the curve L, the operation with the least fuel consumption rate is realized. As described before, the desired reduction ratio for the continuously variable transmission is determined so as to let the engine operate on this curve L. If this curve L is expressed in terms of a relationship between vehicle speed and engine speed, the relationship as illustrated in FIG. 4 is given. Suppose the present vehicular operating state is expressed in FIG. 4 by an operating point B which is expressed in terms of vehicle speed C, throttle opening degree 2/8 and reduction ratio b. If the throttle opening degree is shifted to a new degree 4/8, a new operating point point A as expressed by vehicle speed C, throttle opening degree 4/8, reduction ratio a has to be accomplished. During the process of shifting from the operating point to the new operating point A, the reduction ratio has to change from b to a. Since this change is a shifting toward a large reduction ratio side (a is greater than b), the shifting is effected at a speed determined by the control constant G1. Therefore, the shifting speed is quick, thus allowing a swift shift from the operating point B to the new operating point A.

If the operating state is to be shifted from the operating point A to the operating point B (that is, a shifting from the accelerating state to a constant speed operating state or a coasting state), since the shifting is effected at a speed determined by the control constant G2, the shifting speed is relatively slow, thus allowing a gradual shifting from the operating point A to the operating point B. As a result, a shift from the accelerating state to the normal operating state is made without causing the driver to feel uneasy.

Referring to FIGS. 5, 6A, 6B, 7, and 8 through 13 a preferred embodiment is described.

Referring, first of all, to FIGS. 5, 6A, 6B and 7, a vehicular engine continuously variable transmission system comprises an engine E having a throttle valve TU TH which opens in degrees in response to at least depression degree of an accelerator pedal AC. The engine E is followed by a continuously variable transmission having a drive pulley 1006 and a driven pulley 1051 interconnected by a V-belt 1050 (see FIG. 5).

Figure 7:
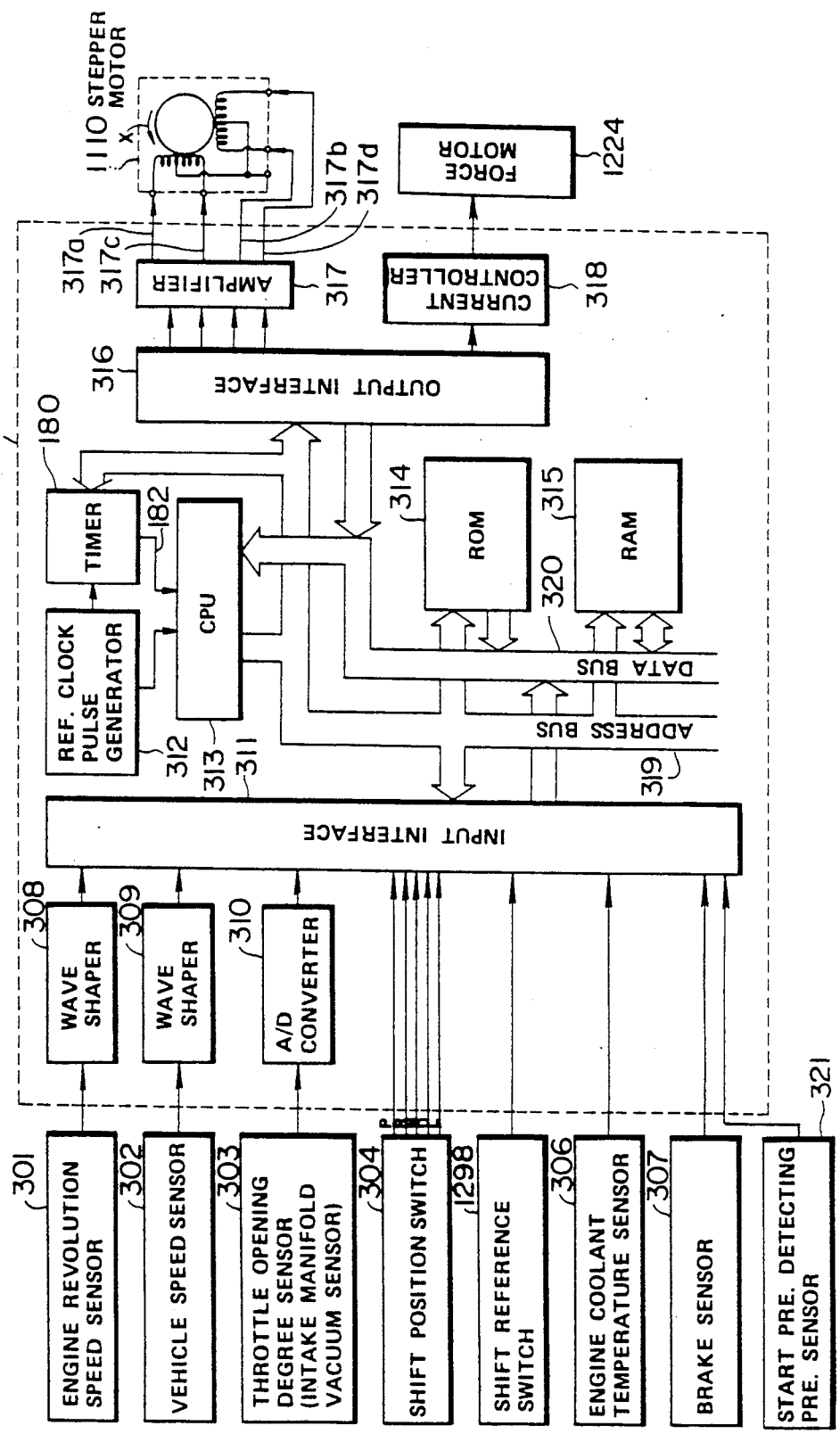
FIG. 7 is a block diagram of a control unit for controlling a shifting and a clutch engagement.

FIGS. 6A and 6B show a hydraulic control system including a start adjusting valve 1118 (see FIG. 6A) comprising a force motor 1224, a shift control mechanism 1112 including a shift control motor, i.e., a stepper motor, 1110 (see FIG. 6B), and an electronic control unit 1300. The construction of the electronic control unit 1300 is shown in FIG. 7.

The vehicular engine continuously variable transmission is described in co-pending U.S. patent application Ser. No. 543,838, filed Oct. 20, 1983 (see FIGS. 1, 2A, 2B and 3) and commonly assigned herewith, which has a corresponding European patent application 83110546.5, filed Oct. 21, 1983, the disclosure of which application is hereby incorporated by reference in its entirety.

Figure 8:
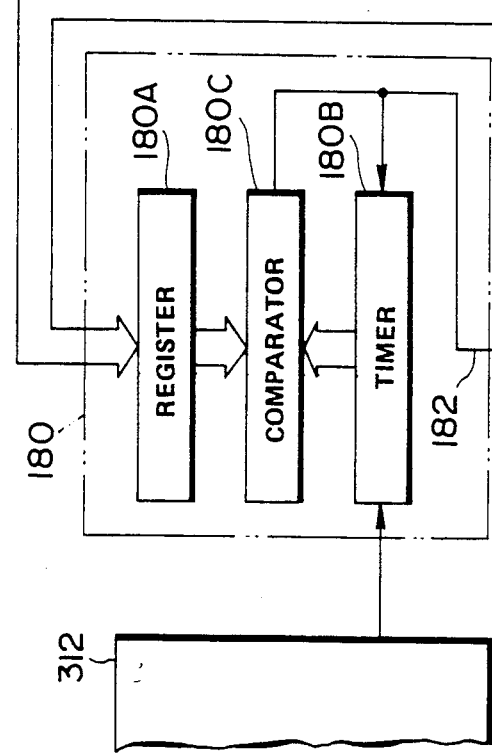
FIG. 8 is an enlarged fragmentary view of FIG. 7 illustrating, in block diagram, constituent elements of a timer which generates an interrupt signal.

In this regard, the reference numerals used in FIGS. 5, 6A, 6B and 7 hereof correspond to the reference numerals used in FIGS. 1, 2A, 2B and 3 of the aforesaid co-pending applications, respectively, except that, in the present application a timer 180 (see FIG. 7) illustrated in detail in FIG. 8 is employed. The timer 180 is provided to generate an interrupt signal 182.

Figure 9:
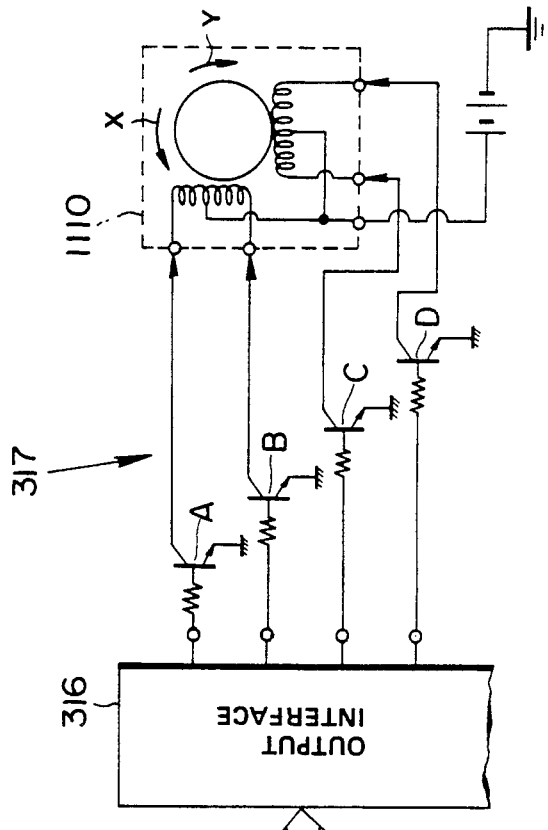
FIG. 9 shows an ON-OFF pattern of transistors A, B, C and D shown in FIG. 8 for each of the four modes 1, 2, 3 and 4.

Referring to FIGS. 8 and 9, the timer 180 comprises a register 180A into which a frequency determined by a step 70B in a flowchart of a control program shown in FIG. 10 is stored, a timer 180B which counts reference clock pulses generated by a reference clock pulse generator 312, and a comparator 180C where the value stored in the register 180A and the value in the timer 180B are compared with each other. When these values become equal to each other, the comparator 180C resets the timer 180B and generates the aforementioned interrupt signal 182. This interrupt signal 182 is used to start or render into operation a stepper motor actuating program shown in FIG. 12 which sill be later described. The timer 180 permits generation of interruption having any desired frequency.

Explaining briefly how to rotate the stepper motor 1110, ON-OFF pattern of transistors A, B, C and D is shifted in the order of transistors A, B, C and D is shifted in the order of 1, 2, 3, 4, 1, 2, 3, 4 .... (see FIG. 9) for rotating the stepper motor 1110 in a direction indicated by an arrow X, whereas the pattern is shifted in the reverse order 4, 3, 2, 1, 4, 3, 2, 1 ... for rotating the stepper motor 1110 in the reverse direction indicated by an arrow Y. Thus, the speed at which the stepper motor 1110 is rotated can be varied by changing the speed at which the pattern is shifted.

Referring to FIG. 10, the flowchart of the control program is described. The references numerals used hereof correspond to the reference numerals used in FIG. 2, respectively, to designate like steps.

Figure 5:
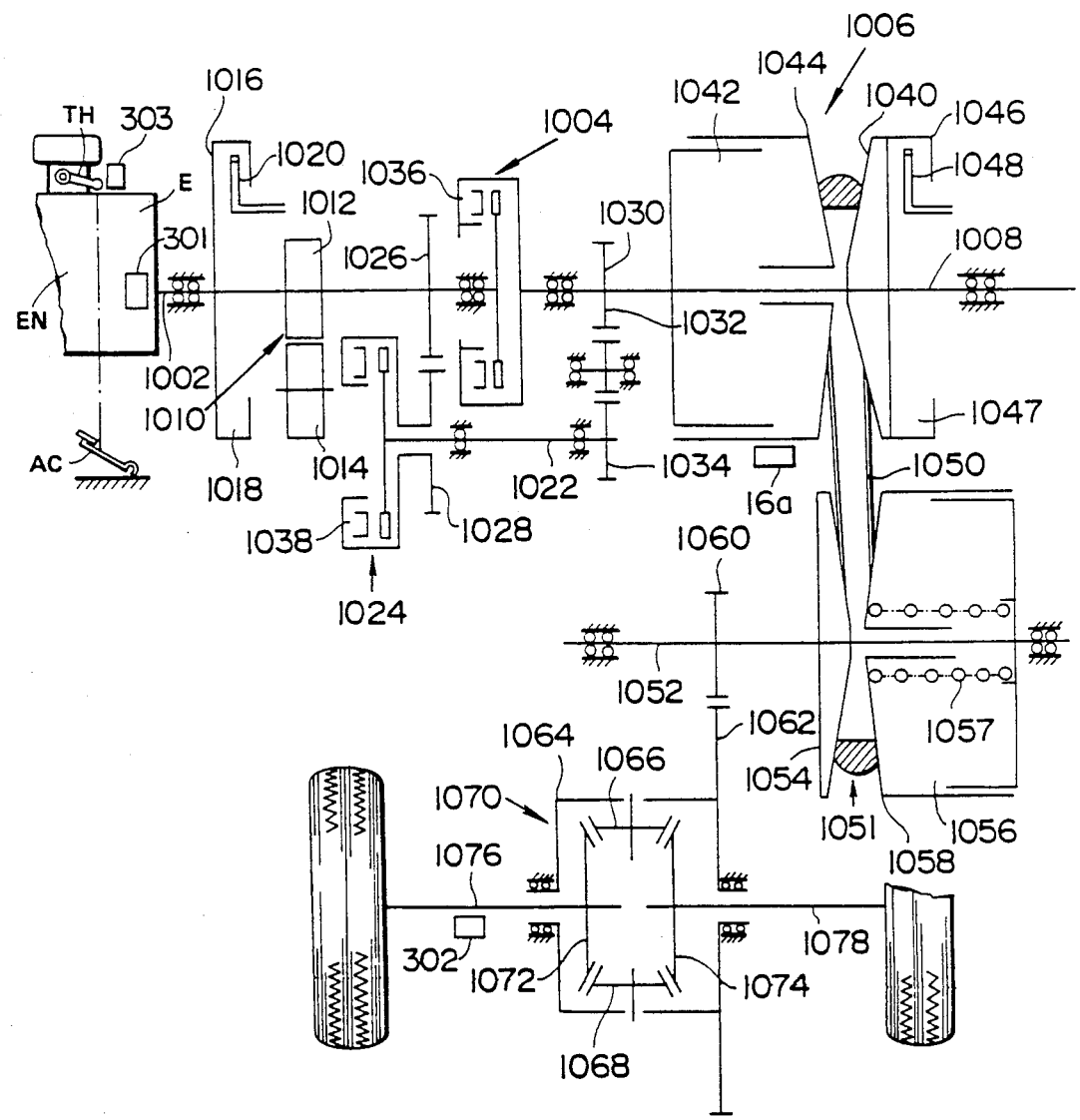
FIG. 5 is a diagrammatic view of a vehicular continuously variable transmission system.

First of all, in a step 52, a throttle opening degree TH and a vehicle speed V are read. A determination is made which of D range and L range is selected in a step 54. If D range is selected, a desired reduction ratio is determined by a table look-up of data illustrated in FIG. 4 using the throttle opening degree TH and vehicle speed V as parameters (in a step 56). If L range is selected, a desired reduction ratio for L range is determined by a table look-up. After executing the step 56 or 58, a step 60A is executed where an engine speed NE is read. In a step 60B, an actual reduction ratio i is obtained by computing an equation K×NE/V, where: K is a constant determined by the final gear ratio and etc. Although, in this control program, the actual reduction ratio i is obtained by computing the equation, the actual reduction ratio may be obtained by measuring the position of an axially movable conical disc of the drive pulley 1006 by means of a reduction ratio detector in the form of a potentiometer 16a as shown in FIG. 5 because the actual reduction ratio is determined by the position of the pulley. After executing the step 60B, a step 62 is executed where a deviation e is obtained by substracting the actual reduction ratio from the desired reduction ratio. Then, a determination is made whether the deviation e is positive or negative. If the deviation e is positive and a shifting toward a small reduction ratio or downshifting is required, the program proceeds to a step 66' where a proportional gain Kp is given a value Kp1 and a different gain Kd is given a value Kd1, whereas if the deviation e is negative and a shifting toward a large reduction ratio or an upshifting is required, the program proceeds to a step 68' where the proportional gain Kp is given a value Kp2 and the differential gain Kd is given a value Kd2. After setting gains, the program proceeds to a step 70A where an actuating speed PPS is obtained by computing an equation $Kpe + Kd_{dt}^{de}$ representing a proportional and integral algorithm which will be described later referring to FIG. 11. The Kp1 and Kd1 are determined considering a transmitting function of the continuously variable transmission and takes values which provide the best response. The Kp2 and Kd2 take values smaller than Kp1 and Kd1, respectively, so as to provide the appropriate relatively slow response. After obtaining the actuating speed PSS in the step 70A, the program proceeds to a step 70B where the actuating speed PSS is converted into a frequency of the timer 180 (see FIG. 8) provided for generating the interrupt signal 182. The frequency obtained in the step 70B is written in the register 180A of the timer 180.

Figure 11:
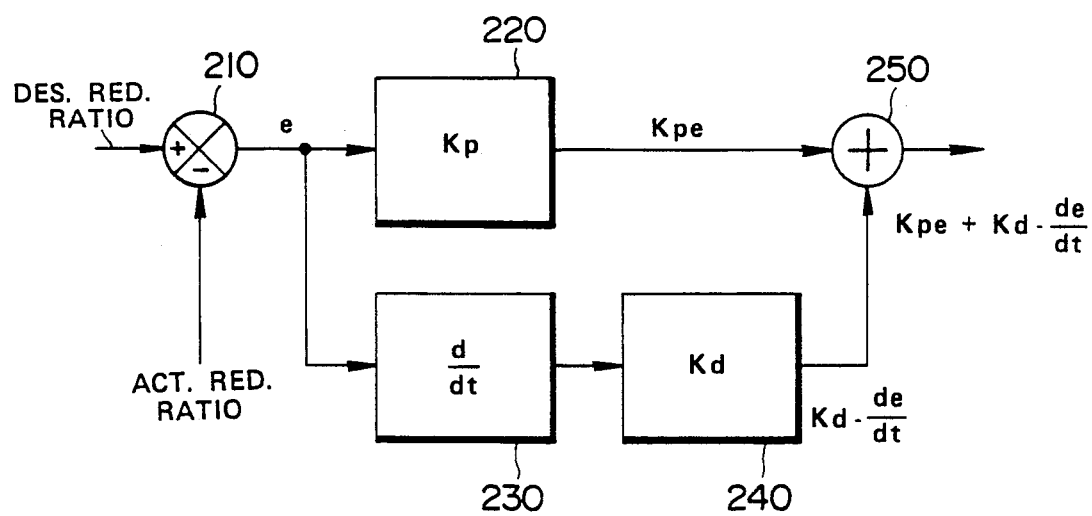
FIG. 11 illustrates a PI control.
Figure 13:
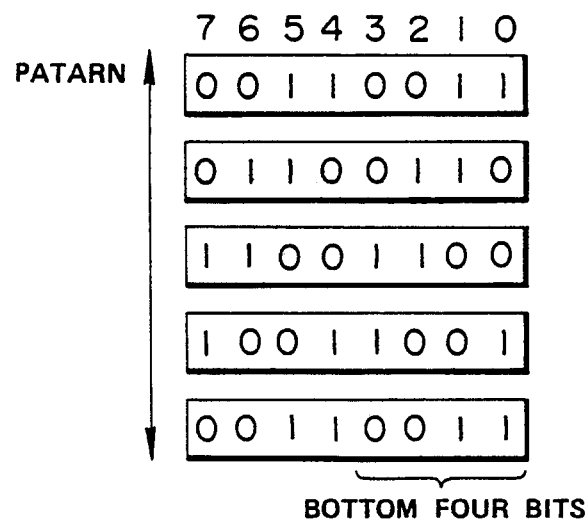
FIG. 13 illustrates signal disposition in 8-bits memory "PATARN".

Referring to FIG. 11, the proportional and integral control is described. At a summation point 210, the actual reduction ratio is subtracted from the desired reduction ratio to provide the deviation e. The proportional gain Kp is multiplied with the deviation e at 220. At 230, the deviation e is differentiated and then the integral gain Kd is multiplied with the result of the differentiation to provide $Kd_{dt}^{de}$. At a summation point 250, the proportional term Kpe is added to the integral term $Kd_{dt}^{de}$.

Figure 12:
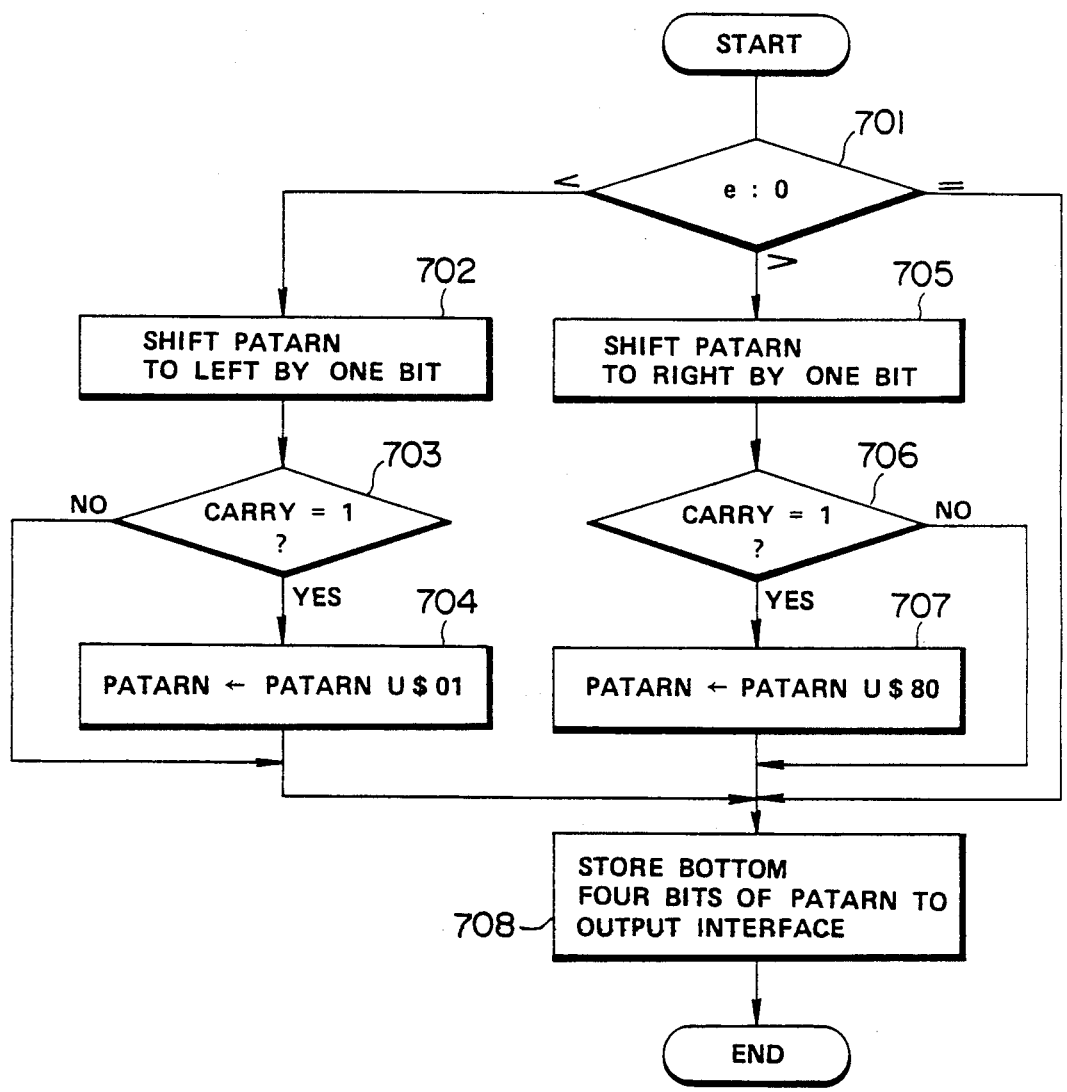
FIG. 12 is a flowchart of a motor actuating program.

FIG. 12 illustrates a flowchart of the stepper motor actuating program which program is started or rendered into operation by the interrupt signal 182 generated by the timer 180. In a step 701, a determination is made whether the deviation e is positive or negative or zero. If it is negative, the program proceeds to a step 702 where PATARN (see FIG. 13) is shifted to the left by one bit. A determination is made whether a carry signal appears or not in a step 703. If the carry signal appears, a digit "1" is written in the "Q" bit of the PATARN. If no carry signal appears, the program proceeds to a step 708. If in the step 701, the deviation e is positive, the program proceeds to a step 705 where PATARN is shifted to the right by one bit and then to a step 706 where a determination is made whether a carry signal appears or not. If the carry signal appears, a digit "1" is written in the "7" bit location. If no carry signal appears, the program proceeds to the step 708. If, in the step 701, the deviation e is zero, the program proceeds to the step 708. In the step 708, the bottom four bits (see FIG. 13) of the PATARN are stored in a digital output device in the output interface 316.

From the description in connection with FIGS. 5 through 12, particularly FIGS. 8, 10, 11, 12 and 13, it will now be understood that the speed at which the stepper motor 1110 is actuated or rotated is determined by the frequency determined in the step 70B (FIG. 10) and stored in the register 180A of the timer 180 (FIG. 8).

I claim:

1. A control device for a vehicular engine continuously variable transmission system, comprising:

first determining means for determining a desired reduction ratio and generating a desired reduction ratio indicative signal;

second determining means for determining an actual reduction ratio of the continuously variable transmission and generating an actual reduction ratio indicative signal;

third determining means responsive to said desired reduction ratio indicative signal and said actual reduction ratio indicative signal for determining whether an upshifting is needed to achieve the desired reduction ratio indicated by said desired reduction ratio indicative signal or a downshifting is needed to achieve the desired reduction ratio indicated by said desired reduction ratio indicative signal;

means for setting a first control constant when said third determining means determines that downshifting is needed and for setting a second control constant when said third determining means determines that upshifting is needed and generating a control constant indicative signal indicative of the control constant set;

fourth determining means for determining a speed at which the actual reduction ratio of the continuously variable transmission is to be shifted toward the desired reduction ratio in response to said control constant indicative signal; and means for adjusting the actual reduction ratio of the continuously variable transmission toward the desired reduction ratio in response to the speed determined by said fourth determining means.

2. A control device for a vehicular engine continuously variable transmission system having a shift control mechanism including an actuator, the control device comprising:

first determining means for determining a desired reduction ratio and generating a desired reduction ratio indicative signal;

second determining means for determining an actual reduction ratio of the continuously variable transmission and generating an actual reduction ratio indicative signal;

third determining means for determining a deviation of said actual reduction ratio indicative signal from said desired reduction ratio indicative signal and generating a deviation indicative signal;

fourth determining means responsive to said deviation indicative signal for determining whether a downshifting is needed to achieve the desired reduction ratio indicated by said desired reduction ratio indicative signal or an upshifting is needed to achieve the desired reduction ratio indicated by said desired reduction ratio indicative signal;

fifth determining means for determining a first control gain when said third determining means determines that downshifting is needed and for determining a second control gain when said third determining means determines that upshifting is needed and generating a control gain indicative signal indicative of the control gain determined;

means for computing a speed at which the actuator of the shift control mechanism is to be actuated in response to said control gain indicative signal;

means for actuating the actuator by one predetermined unit in a direction to reduce the deviation indicated by said deviation indicative signal whenever it is rendered into operation; and means for periodically rendering said actuating means into operation with a frequency which is variable with said computed actuating speed.

3. A control device as claimed in claim 2, wherein said first control gain is larger than the second control gain.

4. A control method for a vehicular engine continuously variable transmission system, comprising the steps of:

determining a desired reduction ratio and generating a desired reduction ratio indicative signal;

determining an actual reduction ratio of the continuously variable transmission and generating an actual reduction ratio indicative signal;

determining, responsive to said desired reduction ratio indicative signal and said actual reduction ratio indicative signal, whether an upshifting is needed to accomplish the desired reduction ratio indicated by said desired reduction ratio indicative signal or a downshifting is needed to accomplish the desired reduction ratio indicated by said desired reduction ratio indicative signal;

setting a first control constant when it is determined that downshifting is needed and a second control constant when it is determined that upshifting is needed and generating a control constant indicative signal indicative of the control constant set;

determining a speed at which the actual reduction ratio of the continuously variable transmission is to be shifted toward the desired reduction ratio in response to said control constant indicative signal; and adjusting the actual reduction ratio of the continuously variable transmission toward the desired reduction ratio in response to the determined actuating speed.

* * * * *